US011713387B2

(12) United States Patent
Cauceglia

(10) Patent No.: US 11,713,387 B2
(45) Date of Patent: *Aug. 1, 2023

(54) WATER QUALITY TEST USING SODIUM NITROPRUSSIDE SOLUTIONS

(71) Applicant: HF Scientific, LLC, Fort Myers, FL (US)

(72) Inventor: Dorian Cauceglia, Cape Coral, FL (US)

(73) Assignee: HF Scientific, LLC, Fort Meyers, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/699,669

(22) Filed: Mar. 21, 2022

(65) Prior Publication Data

US 2022/0204728 A1 Jun. 30, 2022

Related U.S. Application Data

(63) Continuation of application No. 16/980,562, filed as application No. PCT/US2019/021107 on Mar. 7, 2019, now Pat. No. 11,312,839.

(60) Provisional application No. 62/643,978, filed on Mar. 16, 2018.

(51) Int. Cl.
| | |
|---|---|
| *C08K 5/56* | (2006.01) |
| *C08K 5/13* | (2006.01) |
| *C08K 5/05* | (2006.01) |
| *C09K 15/00* | (2006.01) |
| *C01C 3/08* | (2006.01) |
| *C01C 3/12* | (2006.01) |

(52) U.S. Cl.
CPC .................. *C08K 5/56* (2013.01); *C08K 5/05* (2013.01); *C08K 5/13* (2013.01); *C01C 3/08* (2013.01); *C01C 3/12* (2013.01); *C09K 15/00* (2013.01)

(58) Field of Classification Search
CPC . C08K 5/56; C08K 5/315; C08K 5/32; C08K 5/005; C08K 5/05; C08K 5/053; C01C 3/08; C01C 3/12
See application file for complete search history.

(56) References Cited

U.S. PATENT DOCUMENTS

| | | | |
|---|---|---|---|
| 4,501,582 | A | 2/1985 | Schulz |
| 5,071,769 | A | 12/1991 | Kundu et al. |
| 5,919,614 | A | 7/1999 | Livesey et al. |
| 6,315,950 | B1 | 11/2001 | Harp et al. |
| 2015/0374749 | A1 | 12/2015 | Ivanovic-Burmazovic et al. |
| 2017/0009052 | A1 | 1/2017 | Sokol |

FOREIGN PATENT DOCUMENTS

| | | |
|---|---|---|
| CN | 1857307 A | 11/2006 |
| CN | 102727727 A | 10/2012 |
| RU | 1515606 | 8/1995 |

OTHER PUBLICATIONS

ISA/US International Search Report and Written Opinion for corresponding International Application No. PCT/US2019/021107 dated Apr. 30, 2019 (6 pgs).
Derwent English abstract of SU 1515606 A1; to Vashchenkova et al. published Aug. 9, 1995 in Russian (Year: 1995).
Vrabel et al., "Reconstitution of Sodium Nitroprusside", American Journal of Hospital Pharmacy, vol. 32, Issue 2, p. 140-141, Feb. 1, 1975. Partial document (p. 140 only). (Year: 1975).
Extended European Search Report dated Oct. 22, 2021 of EP. Application No. 19766801.5 (5 pages).

*Primary Examiner* — Jane L Stanley
(74) *Attorney, Agent, or Firm* — Laura W. Smalley; Harris Beach PLLC

(57) ABSTRACT

A method of testing the composition or quality of water includes dissolving about two parts by weight of a 2-hydroxybenzyl alcohol and about one part by weight of a sodium nitroprusside in about seventy-five parts by weight of a polyethylene glycol; adding the sodium nitroprusside solution to a water sample to catalyze an indophenol monochloramine reaction; and detecting the concentration of monochloramine in the water sample. The polyethylene glycol may be a polyethylene glycol 300, a PEG-400 or a PEG-1000. The method may also be accomplished with a solution made by dissolving a 2-hydroxybenzyl alcohol and a sodium nitroprusside in a mixture of propane-1,2-diol and water.

18 Claims, No Drawings

WATER QUALITY TEST USING SODIUM NITROPRUSSIDE SOLUTIONS

CROSS-REFERENCE TO RELATED APPLICATIONS

This application is a continuation of co-pending U.S. patent application Ser. No. 16/980,562, filed Sep. 14, 2020, which is a national stage application under 35 U.S.C. § 371 of PCT Application PCT/US19/21107, filed Mar. 7, 2019, METHOD AND COMPOSITION FOR PRESERVING SODIUM NITROPRUSSIDE SOLUTIONS published as WO2019177858A1, which claims priority to and the benefit of U.S. provisional patent application Ser. No. 62/643,978, METHOD AND COMPOSITION FOR PRESERVING SODIUM NITROPRUSSIDE SOLUTIONS, filed Mar. 16, 2018, which applications are incorporated herein by reference in their entirety.

FIELD OF THE APPLICATION

The application relates to sodium nitroprusside solutions and particularly to the shelf-life of sodium nitroprusside solutions.

BACKGROUND

Sodium nitroprusside solutions typically have a relatively limited shelf life of about 48 hours. As such, industrial distribution of a prepared solution for later use has not been practical.

SUMMARY

According to one aspect, a method to extend a shelf life of a sodium nitroprusside solution includes: dissolving about two parts by weight of a 2-hydroxybenzyl alcohol and about one part by weight of a sodium nitroprusside in about seventy-five parts by weight of a polyethylene glycol.

In one embodiment, the method includes: dissolving about 3 g of 2-hydroxybenzyl alcohol and about 1.5 g sodium nitroprusside in about 100 ml of polyethylene glycol at about 60° C.

In another embodiment, the polyethylene glycol includes a polyethylene glycol 300.

In yet another embodiment, the polyethylene glycol includes a PEG-300.

In yet another embodiment, the polyethylene glycol includes a PEG-400.

In yet another embodiment, the polyethylene glycol includes a PEG-1000.

According to another aspect, a composition for preserving a sodium nitroprusside solution includes: about two parts by weight of a 2-hydroxybenzyl alcohol and about one part by weight of a sodium nitroprusside dissolved in about seventy-five parts by weight of a polyethylene glycol.

In one embodiment, the composition includes: about 3 g of 2-hydroxybenzyl alcohol and about 1.5 g sodium nitroprusside dissolved in about 100 ml of polyethylene glycol at about 60° C.

In another embodiment, the sodium nitroprusside solution is a catalyst for an indophenol monochloramine reaction.

In yet another embodiment, the indophenol monochloramine reaction includes a water composition test or a water quality test.

According to yet another aspect, a composition for preserving a sodium nitroprusside solution includes: about two parts by weight of a 2-hydroxybenzyl alcohol and about one part by weight of a sodium nitroprusside dissolved in about seventy-five parts by weight of a component selected from the group consisting of a polyethylene glycol, an ethane-1, 2-diol, a propane-1,2-diol, a polymer with a H—(O—CH2-CH2)n-OH structure either linear or cross linked, and a glycopolymer.

The foregoing and other aspects, features, and advantages of the application will become more apparent from the following description and from the claims.

DETAILED DESCRIPTION

DEFINITIONS: Glycol like as used hereinbelow is defined to include diols and their polymers. Examples include, but are not limited to ethane-1,2-diol, propane-1,2-diol, polymers with the general structure H—(O—CH2-CH2)n-OH either linear or cross linked, and other glycopolymers.

Sodium nitroprusside solutions typically have a relatively limited shelf life of about 48 hours. As such, industrial distribution of a prepared solution for later use has not been practical.

Sodium nitroprusside solutions are useful as a catalyst for indicator solutions for water testing. For example, a sodium nitroprusside can be used as a catalyst for an indophenol monochloramine reaction in water composition and water quality testing processes. However, nitroprusside is an iron-based compound and the iron oxidizes and falls out, leading to an unacceptably short shelf-life.

What is needed is a method and composition for preserving sodium nitroprusside solutions, for example, to maintain the effectiveness of the indophenol monochloramine reaction.

Also, more generally, there is a need for a method and composition to preserve sodium nitroprusside solutions, so that prepared solutions can be distributed and stored with a much longer shelf life for later use.

It has been realized that dissolving sodium nitroprusside in polyethylene glycol, the solution can be preserved for an indefinite length of time, the shelf life having been shown to be at least greater than two years. For example, polyethylene glycol-300 (PEG-300) appears to be capable of preserving this solution indefinitely.

sodium nitroprusside:

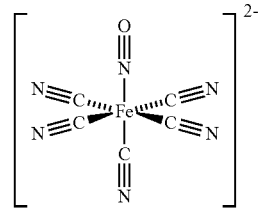

polyethylene glycol-300:

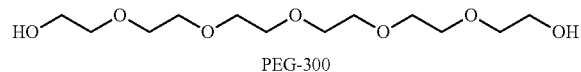

PEG-300

To my best understanding, the polyethylene glycol (e.g. PEG-300) works by preventing the oxidation of the Sodium nitroprusside by scavenging free radicals. Free radicals can be generated by contaminants or by UV light. The polyethylene glycol also sequesters any iron that may have oxidized to Fe3+. The polyethylene glycol also blocks UV light to reduce the formation of radicals.

Example 1: PEG-300 as an Antioxidant

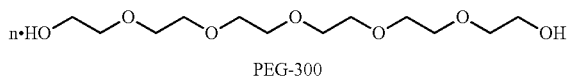

PEG-300

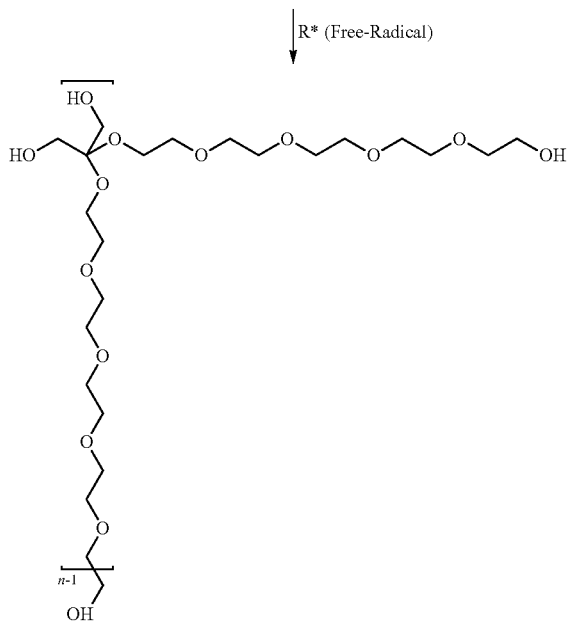

Example 2: PEG-300 as a Sequestrant

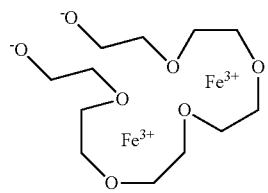

PEG-300, and similar variants, is merely representative of a polyethylene glycol which can be used. Polyethylene glycol is available in many variants, such as, for example, PEG-300, PEG-400, PEG-1000, etc. Any suitable polyethylene glycol can be used. Moreover, it is believed that other "glycol like" chemicals can be used.

Example 3

The example is an indicator solution used in water testing. An exemplary indicator solution was prepared by dissolving about 3 g of 2-hydroxybenzyl alcohol and about 1.5 g sodium nitroprusside in about 100 ml of polyethylene glycol 300 at about 60° C.

2-hydroxybenzyl:

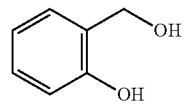

Example 4

In an exemplary application, a sodium nitroprusside solution, such as the solution of example 1, can be used as a catalyst in an indophenol monochloramine reaction. The reaction cannot occur without the catalyst. Such indophenol monochloramine reactions are of particular interest for use in testing water.

Generally, a method to extend a shelf life of a sodium nitroprusside solution includes: dissolving about two parts by weight of a 2-hydroxybenzyl alcohol and about one part by weight of a sodium nitroprusside in about seventy-five parts by weight of a glycol (typically a polyethylene glycol) or glycol "like" material, such as, for example, ethane-1,2-diol, propane-1,2-diol, polymers with the general structure H—(O—CH2-CH2)n-OH either linear or cross linked, and other glycopolymers, or any other suitable polyethylene glycol.

In some embodiments, the polyethylene glycol liquid or a glycol like liquid material can be used at about 100% liquid polyethylene glycol or 100% liquid glycol like material without thinning. Thinning can be performed by mixing with another liquid, such as, for example, typically thinning by water. However, polyethylene glycol or glycol like material solutions thinned to between about 30% and about 100%, can be used as well. Successful tests were performed with about 30% and about 60% liquid polyethylene glycol thinned by water.

Any suitable temperature for dissolving can be used. Those skilled in the art will appreciate that in most embodiments, dissolving temperatures below about 70° C. will be used, because, for example, PEG-300 scorches and decomposes at about 70° C. In some embodiments a temperature of about 60° C. has been used.

Also, a composition for preserving a sodium nitroprusside solution includes: about two parts by weight of a 2-hydroxybenzyl alcohol and about one part by weight of a sodium nitroprusside dissolved in about seventy-five parts by weight of a glycol "like" material including solutions of any suitable glycol like material (e.g. any suitable polyethylene glycol).

Generally, a solution synthesized as described herein can be stored in a plastic or glass enclosure, typically a bottle. Shielding from light, including tinted glass or plastic is preferable. Also, storage is preferred at temperatures between about −15° C. and 65° C.

In summary, after dissolving sodium nitroprusside in polyethylene glycol, the solution can be preserved for an indefinite length of time, the shelf life having been shown to be at least greater than two years. For example, polyethylene glycol-300 (PEG-300) appears to be capable of preserving this solution indefinitely.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of testing the composition or quality of water, the method comprising:
    dissolving about two parts by weight of a 2-hydroxybenzyl alcohol and about one part by weight of a sodium nitroprusside in about seventy-five parts by weight of a polyethylene glycol thereby creating a sodium nitroprusside solution;
    adding the sodium nitroprusside solution to a water sample to catalyze an indophenol monochloramine reaction; and
    detecting the resulting concentration of monochloramine in the water sample.

2. The method of claim 1, comprising: dissolving 3 g of 2-hydroxybenzyl alcohol and 1.5 g sodium nitroprusside in 100 ml of polyethylene glycol 300 at about 60° C.

3. The method of claim 1, wherein said polyethylene glycol comprises a polyethylene glycol 300.

4. The method of claim 1, wherein said polyethylene glycol comprises a PEG-400.

5. The method of claim 1, wherein said polyethylene glycol comprises a PEG-1000.

6. A method of testing the composition or quality of water, the method comprising:
    dissolving about two parts by weight of a 2-hydroxybenzyl alcohol and about one part by weight of a sodium nitroprusside in a component comprising a liquid selected from the group consisting of polyethylene glycol, ethane-1,2-diol, propane-1,2-diol, a polymer with a H—(O—CH$_2$—CH$_2$)$_n$—OH structure either linear or cross-linked, and a glycopolymer, thereby creating a sodium nitroprusside solution;
    adding the sodium nitroprusside solution to a water sample to catalyze an indophenol monochloramine reaction; and
    detecting the resulting concentration of monochloramine in the water sample.

7. A method of testing the composition or quality of water, the method comprising:
    dissolving a 2-hydroxybenzyl alcohol and a sodium nitroprusside in a
        mixture of propane-1,2-diol and water, thereby creating a sodium nitroprusside solution;
    adding the sodium nitroprusside solution to a water sample to catalyze an indophenol monochloramine reaction; and
    detecting the resulting concentration of monochloramine in the water sample.

8. The method of claim 7, wherein the mixture of propane-1,2-diol and water comprises approximately 30% propane-1,2-diol and approximately 70% water by volume.

9. The method of claim 8, wherein the sodium nitroprusside solution comprises approximately 1% sodium nitroprusside by weight.

10. The method of claim 9, wherein the ratio of the 2-hydroxybenzyl alcohol to the sodium nitroprusside is about two parts by weight to one part by weight.

11. The method of claim 7, wherein the sodium nitroprusside solution comprises approximately 1% sodium nitroprusside by weight.

12. The method of claim 11, wherein the ratio of the 2-hydroxybenzyl alcohol to the sodium nitroprusside is about two parts by weight to one part by weight.

13. A preserved sodium nitroprusside solution comprising: a 2-hydroxybenzyl alcohol and a sodium nitroprusside dissolved in a mixture of propane-1,2-diol and water, where the preserved sodium nitroprusside solution is capable of catalyzing an indophenol monochloramine reaction.

14. The sodium nitroprusside solution of claim 13, wherein the mixture of propane-1,2-diol and water comprises approximately 30% propane-1,2-diol and approximately 70% water by volume.

15. The sodium nitroprusside solution of claim 14, wherein the solution comprises approximately 1% sodium nitroprusside by weight.

16. The sodium nitroprusside solution of claim 15, wherein the ratio of the 2-hydroxybenzyl alcohol to the sodium nitroprusside is about two parts by weight to one part by weight.

17. The sodium nitroprusside solution of claim 13, wherein the solution comprises approximately 1% sodium nitroprusside by weight.

18. The sodium nitroprusside solution of claim 17, wherein the ratio of the 2-hydroxybenzyl alcohol to the sodium nitroprusside is about two parts by weight to one part by weight.

* * * * *